June 14, 1966  J. E. LINDBERG, JR  3,255,698
NOSE-CONE COOLING OF SPACE VEHICLES
Filed April 5, 1962  2 Sheets-Sheet 1

INVENTOR.
JOHN E. LINDBERG, Jr.
BY
ATTORNEY

June 14, 1966  J. E. LINDBERG, JR  3,255,698
NOSE-CONE COOLING OF SPACE VEHICLES
Filed April 5, 1962  2 Sheets-Sheet 2

INVENTOR.
JOHN E. LINDBERG, Jr.
BY
ATTORNEY

3,255,698
NOSE-CONE COOLING OF SPACE VEHICLES
John E. Lindberg, Jr., 1211 Upper Happy Valley Road,
Lafayette, Calif.
Filed Apr. 5, 1962, Ser. No. 186,600
6 Claims. (Cl. 102—92.5)

This application is a continuation-in-part of application Serial No. 725,110, filed Mar. 31, 1958, now abandoned.

This invention relates to the nose-cone cooling of space vehicles including missiles and more particularly to missiles whose nose structures incorporate means for dissipating heat therefrom.

It is well known that an object entering the earth's atmosphere at even moderate speed is heated considerably by the attendant aerodynamic conditions at the surface of the object. Such heating occurs when vehicles reenter the atmosphere and is a series problem, forcing drastic limitations on the maximum reentry speed which a structure of given design can attain without being severely damaged or even destroyed. This heat is primarily developed and is largely concentrated at the nose.

An important object of the present invention is to efficiently dissipate the heat developed at the nose. By achieving this object, the invention makes it possible to use higher reentry speeds and therefore gives greater freedom in missile design and increases the missile's ability to avoid interception.

Another object of this invention is to provide a missile structure wherein the heat developed at the nose surface is carried to other parts of the missile and dissipated there, thereby lowering the nose temperature.

Other objects and advantages of the invention will appear from the following detailed description of some preferred embodiments thereof.

In order to illustrate the invention more clearly, the figures have been made somewhat diagrammatic in form and do not show the contents within the shell since the undesirable heat is developed at the shell and must be dissipated therefrom. The invention is independent of the contents of the vehicle itself.

Figure 1:
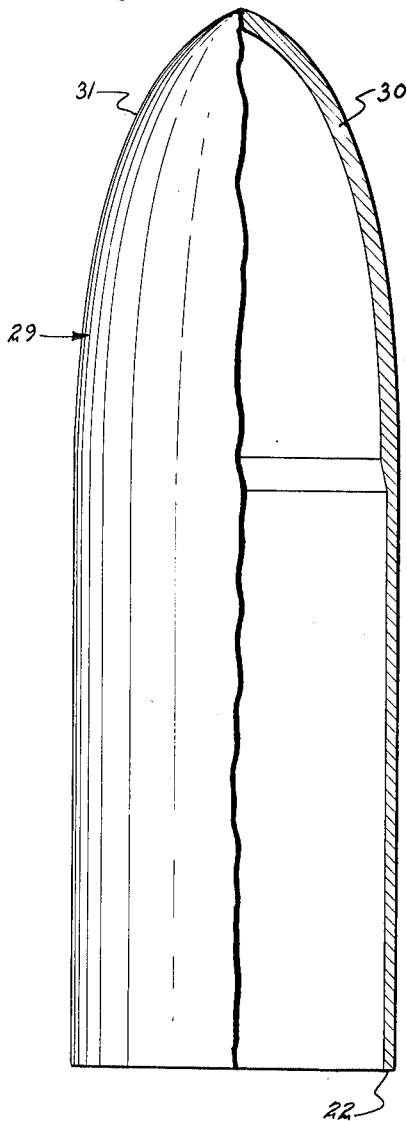
FIG. 1 is a view in elevation and half in section of the shell of the forward portion of a missile.
Figure 2:
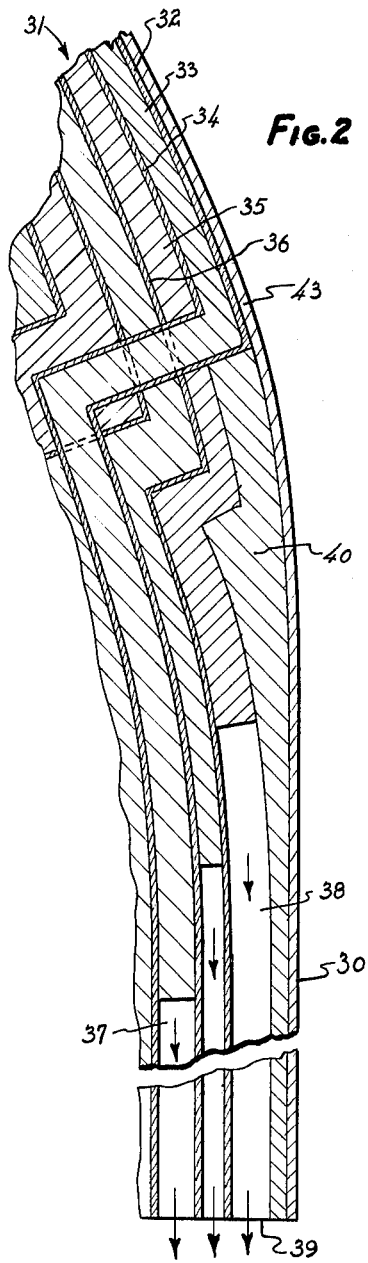
FIG. 2 is a greatly enlarged fragmentary view in elevation and in section of a portion of the shell of FIG. 1 showing incorporation therein of one form of the present invention.

As an illustrative example of a space vehicle to which this invention applies, a missile 29 is shown in FIG. 1, which indicates the general form of its shell 30. Referring next to FIG. 2, it will be noted that the nose portion 31 of the shell 30 may be laminated to provide layers 32, 34, and 36, for example, of a suitable heat-conducting metal with alternate layers of heat dissociable material 33 and 35 sandwiched therebetween. The metal layers 32, 34, and 36 are preferably between 0.005″ and 0.050″ thick, while the layers 33 and 35 may be between about 0.05″ and 1.0″ thick. Although only five layers 32, 33, 34, 35, and 36 are shown in the drawings, by way of example, the laminated shell 30 in the nose region 31 typically has dozens of such laminations.

The heat-dissociable material may be comprised of hydrides of the so-called getter metals. These hydrides, as explained in my co-pending application Serial No. 695,357, filed November 8, 1957, now Patent No. 3,075,361, are valuable heat-transfer agents, because the metallic hydride is dissociated into metal and hydrogen in an endothermic reaction, absorbing a large amount of heat per unit weight and per unit volume, as illustrated in Tables I and II below.

TABLE I.—THERMODYNAMIC PROPERTIES OF TYPICAL ALKALINE AND ALKALINE EARTH HYDRIDES

| Hydride | Heat of Dissociation in gram-calories per gram of compound | Heat of Dissociation in gram-calories per cubic centimeter of compound | Latent Heat of Fusion of the Metal in calories per cubic centimeter | Latent Heat of Vaporization of the Metal in calories per cubic centimeter | Specific Heat of the Metal in calories per cubic centimeter per ° C. near 20° C. |
|---|---|---|---|---|---|
| $LiH$ | 2,720 | 2,230 | 53 | 2,590 | 0.418 |
| $NaH$ | 571 | 788 | 26 | 9,850 | 0.29 |
| $KH$ | 339 | 492 | 13 | 426 | 0.15 |
| $CaH_2$ | 1,070 | 2,030 | 80 | 1,490 | 0.23 |
| $SrH_2$ | 426 | 1,382 | 67 | 1,070 | 0.46 |
| $BaH_2$ | 294 | 1,238 | 47 | 1,080 | 0.08 |

TABLE II.—THERMODYNAMIC PROPERTIES OF TYPICAL GROUP B HYDRIDES

| Hydride | Heat of Dissociation in gram-calories per gram of compound | Heat of Dissociation in gram-calories per cubic centimeter of compound | Latent Heat of Fusion of the Metal in calories per cubic centimeter | Latent Heat of Vaporization of the Metal in calories per cubic centimeter | Specific Heat of the Metal in calories per cubic centimeter per ° C. near 20° C. |
|---|---|---|---|---|---|
| $TiH_{1.75}$ | 634 | 2,480 | 471 | 10,050 | 0.62 |
| $ZrH_{1.92}$ | 418 | 2,275 | 392 | 10,150 | 0.45 |
| $PdH_{0.59}$ | 237 | 255 | 456 | 12,400 | 0.70 |

Certain metals such as copper, tungsten, iron, and nickel which form hydrides of the class known as group A (others are listed in my referred-to patent application Serial No. 695,357) are suitable for use when combined with group B hydrides. The formation of a group A hydride is endothermic, and, since the dissociation of a group B hydride is also endothermic, the combination of a type A metal with a group B hydride will absorb heat as the temperature of the surrounding medium is elevated. Some properties of type A hydrides are listed in Table III.

TABLE III.—THERMODYNAMIC PROPERTIES OF TYPICAL HYDRIDES OF GROUP A MATERIALS

| Hydride | Heat of Formation in gram-calories per gram of compound | Heat of Formation in gram-calories per cubic centimeter of compound | Latent Heat of Fusion of the Metal in calories per cubic centimeter | Latent Heat of Vaporization of the Metal in calories per cubic centimeter | Specific heat of the Metal in calories per cubic centimeter per ° C., near 20° C. |
|---|---|---|---|---|---|
| $NiH_2$ | 97.2 | 684 | 641 | 12,500 | 0.93 |
| $CuH$ | 79.3 | 506 | 438 | 11,200 | 0.81 |

Suitable hydrides include the stoichiometric hydrides of the alkali and alkaline earth metals and the non-stoichiometric getter hydrides, some of which are listed above in Tables I and II. The stoichiometric metallic hydrides are those of lithium, sodium, potassium, rubidium, cesium, francium, calcium, strontium, barium, and radium, all of which are suitable for this invention, except that some of them are currently expensive. Beryllium and magnesium form stoichiometric hydrides that decompose at low temperatures (beryllium hydride at about 125° C. and magnesium hydride at about 280° C. to 300° C.). Suitable non-stoichiometric hydrides, members of group B, are those of scandium, titanium, vanadium, ytterbium, zirconium, niobium, hafnium, tantalum, the rare-earth metals (atomic numbers, 57–71), and the actinides (atomic numbers, 89–103), though many of these are currently expensive and difficult to obtain in quantity.

Also useful are the borohydrides—compounds of metals with the borohydride radical, $BH_4$. Examples are the borohydrides of aluminum, beryllium (decomposes at 123° C.), lithium (decomposes at 275° C.), sodium, zirconium, etc. Of course, for most applications, some of these are much more useful than others while still others are impractical in some situations. The selection can be made to accommodate the desired operating conditions.

Alloys of hydrides are also useful, including alloys of alkaline or alkaline earth hydrides alone, alloys of the non-stoichiometric hydrides, alloys comprised of members of each group, and alloys of or with borohydrides therewith. Hereafter the generic term type "B" hydride shall be used to designate the alkaline earth and alkaline hydrides as well as the group B non-stoichiometric getter hydrides.

In addition to the endothermic processes described previously as means of heat transfer, utilization may be made of the latent heats of fusion and vaporization of the metals involved in the hydride and of a carrier for the hydride, such as ceramic or graphite. Fusion and vaporization are, of course, endothermic processes; fusion requiring on the order of a few hundred calories per cc. of metal and vaporization requiring about 5 to 15 kilocalories per cc. of metal. Similarly the heats of dissociation and of ionization for the liberated hydrogen may also, under favorable conditions, be used for the heat transfer process. The magnitude of heat of dissociation of hydrogen is on the order of 100 kcal./mole $H_2$ and that for the ionization is on the order of 300 kcal./mole hydrogen ions. In addition, when metallic vapor is present, it may also be possible to utilize its heat of dissociation and of ionization as valuable heat transfer mechanisms. Most gases are fully dissociated above 8000° K. and are ionized above 16,000° K. at one atmosphere of pressure. Whether the aforementioned properties are useful in a particular application, depends upon the actual temperature of the nose cone in that application. This temperature, in turn, depends upon the velocity of the vehicle and the medium in which it is moving. These conditions determine to some extent the optimum choice of heat transfer material and of engineering design. The examples to be described will illustrate this. The gas temperature near the surface of the nose cone may be found from the following approximate formula $$T - T_0 = \left(\frac{v}{100}\right)^2$$

where:

$v$ = vehicle velocity in miles per hour.
$T_0$ = initial temperature of the atmosphere in ° C.
$T$ = Temperature of the gas near the surface of the nose cone in ° C.

As an example of the use of the formula let:

$T_0 = 0°$ C.
$v = 10,000$ miles per hour.

then $$T = \left[\frac{10,000}{100}\right]^2 = 10,000° \text{ C.}$$

In the event it is decided that advantage may be taken of the heats of dissociation and of ionization of the liberated gas, it may be desirable to employ "deuterides" instead of hydrides since the heats of dissociation and of ionization for deuterium are larger than those of hydrogen. For example, palladium deuteride, whose general properties correspond to those of palladium hydride, may be used.

The first examples of my invention to be discussed are particularly applicable when the aerodynamic conditions at the nose cone produce temperatures below that required for appreciable ionization of a gas. These conditions will be experienced when a relatively small magnitude of heat is generated over a relatively long period of time. Under these conditions oxidation of any or all oxidizable unprotected surfaces or fluids released may take place, and oxidation is an undesirable exothermic reaction.

In the embodiment of FIGS. 1 and 2, each layer 33, 35 (and so on) of heat-dissociable material is connected to a duct 37, 38 (and so on) which in turn extends to and exhausts at the aft end 39 of the missile shell 30. The metal layers 32, 34, 36 (and so on) may be special alloy steels or any highly heat-resistant metal which is also a good heat conductor and may be coated or processed to prevent or retard oxidation. For example the layers 32, 34, 36 may be siliconized molybdenum, i.e., molybdenum which has been processed to convert the skin to molybdenum disilicide to protect it from oxidation.

As heat is generated at the first metal lamination 32, the first layer of heat-dissociable material 33 receives most of the transferred heat. The result, particularly when a type "B" hydride is used, is an endothermic reaction wherein hydrogen is outgassed, removing a large quantity of heat as heat of dissociation (see Table II, and the hydrogen is then passed through the duct 37 and carried aft to the exhaust point 39, carrying with it some of the developed heat contained in the hydrogen by virtue of its relatively high specific heat. At the exhaust point 39, the hydrogen may oxidize and be used as desired or expelled. As the layer 33 becomes fully outgassed and can no longer transfer heat away from the metal 32 by outgassing hydrogen in an endothermic reaction, the first thin layer 32 of metal will melt away. The metal layer 32 may possibly oxidize but not before heat transfer has been carried out by the endotherm of the heat dissociable reaction. This melting is also endothermic and will cool the nose 31 somewhat, exposing the first layer 33 of the heat-dissociable material. This layer 33, having outgassed, is now substantially metal, and it too is carried away, as by melting, in another endothermic reaction that tends to cool the nose 31. Table IV shows the melting points of typical metals.

TABLE IV.—MELTING AND BOILING POINTS OF THE METALS OF TABLES I, II, AND III

| Compound | Melting Point at 1 atm. of the Metal, °C. | Boiling Point at 1 atm. of the Metal, °C. |
| --- | --- | --- |
| LiH | 180 | 1,370 |
| NaH | 98 | 892 |
| KH | 63.4 | 770 |
| $CaH_2$ | 850 | 1,440 |
| $SrH_2$ | 770 | 1,380 |
| $BaH_2$ | 704 | 1,640 |
| $TiH_{1.75}$ | 1,812 | 3,535 |
| $ZrH_{1.92}$ | 1,852 | 5,000 |
| $PdH_{0.59}$ | 1,552 | 4,000 |
| NiH | 1,453 | 2,730 |
| CuH | 1,083 | 2,600 |

The heat is now transferred chiefly by the next metal lamination 34 to the next layer of heat-dissociable material 35, which outgasses through its duct 38 to the end 39 of the missile. Since, as stated before, there may typically be dozens of such layers, the process of heat transfer via the heat of transformation of the heat-dissociable material, the transportation of hydrogen, the melting of the metal layer, and the melting and dissipation of the outgassed metal, continues from layer to layer always aiding in the cooling of the nose of the missile except for possible oxidation, which in any case, because of structural design, will be limited in its capacity to oppose the desired heat transfer characteristics. The number, thickness, and composition of the metal layers and the heat-dissociable material layers may be adjusted by design to insure that all aerodynamic heating developed by the re-entry of the missile into the atmosphere will be dissipated before all these protective laminations have been destroyed. The heat dissociable materials are so chosen that the dissociation endotherm is approximately completed before temperatures are attained at which refusion of the metals involved takes place.

At some given portion 40 (see FIG. 2) the layers are adjusted in thickness so that the nose 31 of the missile will always be a smooth contour of proper shape as each layer is destroyed. Also, the ducts 37, 38, etc. are so arranged that they are cleared of hydrogen upon the dissolution of the getter layers to which they are connected. The inner layers of the getter material preferably terminate at progressively greater distances down the side of the nose cone, insuring that the outgassed material will not burn too near to a duct that is then carrying hydrogen from a lower outgassing layer. This is shown in the stepped construction of FIG. 2.

Figure 3:
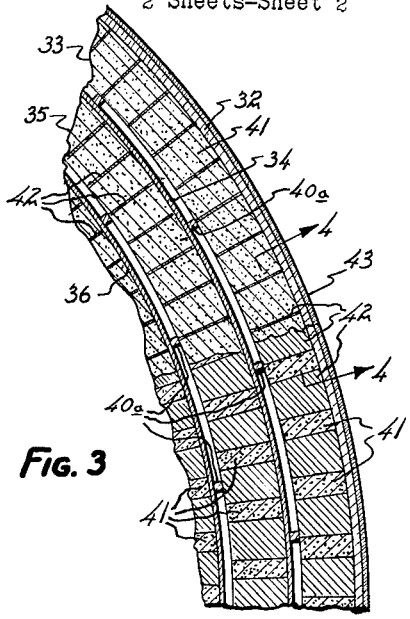
FIG. 3 is a further enlarged fragmentary view of a portion of FIG. 2 showing one type of lamination structure suitable for use in the shell of FIG. 2.
Figure 4:
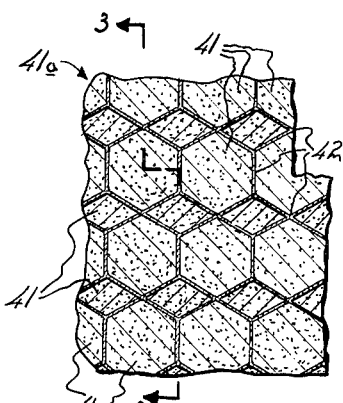
FIG. 4 is a fragmentary view in section taken along the line 4—4 in FIG. 3.

The laminations may be constructed as shown in FIGS. 3 and 4. Each layer 33, 35, etc. of heat-dissociable material may be constructed by packing hydride 41 into cells 42 of sheets 41a of metal which have a honeycomb form, such as "Hexcell" honeycombed metal. Other cells 42 are empty to give gas passages. The metal forming the honeycomb sheet 41a may be the same as the metal in the layers 32, 34, and 36 or may be another metal, but in either case the metal should be one which has a melting point above the temperature required for completion of the dissociation endotherm of the heat-dissociable material. One side of each honeycomb sheet 41a may then be intimately bonded to its outer layer 32, 34, etc., while the unbonded side gives a gas passage 37, 38 between laminations. Structural members 40a which may be constructed of metal or ceramic are provided to maintain the fabricated layers 33, 35, etc. rigidly in place. They are small and do not obstruct gas flow through the passages 37, 38. The laminations thus formed possess an advantage in that there is more rapid transfer of heat through the metal 41a to the getter material 41, and this rapid heat transfer increases the efficiency of the nose cooling operation.

If desired, a relatively thick coating of ceramic or vitreous material 43 may be applied over each layer of metal or over at least the outer layer 32 to delay heating and thereby delay destruction of a given layer of the lamination. Such a coating 43 is preferably applied to the side of the layer receiving the heat, and is illustrated in FIG. 2 where a ceramic coat 43 is shown over the outer metal layer 32. There may be coatings over the layers 34 and 36 also, although these are not illustrated in this view.

The nose cone may utilize a combination of both endothermically and exothermically heat dissociable materials in nose cone cooling. This form of my invention is preferred when aerodynamic conditions at the nose cone result in temperatures near those producing substantial ionization of a gas. Under these conditions, oxidation rates are very slow and thus oxidation does not become an important factor. Typically an outermost layer 43 of the nose cone comprises ceramic, graphite, or other high refractory material. A certain fraction of the cells containing type "A" metal while the remaining pores contain either type "B" hydride or type "B" deuteride.

Heat generated at the surface 43 of the nose cone causes the endothermic dissociation of the type "B" hydride or deuteride. The liberated gas thus flows to adjacent cells 42, some of which contain type "A" metal, to form type "A" hydride or deuteride, an endothermic reaction. As the temperature of the nose cone continues to rise, melting and subsequent evaporation of the metals occur, and the metallic vapors rise to the surface 43 of the nose cone along with the liberated gas. There, subject to the extreme heat generated at the surface 43, they endothermically dissociate and ionize. This process, which takes place at the surface 43 of the nose cone, does not necessarily carry heat away from the nose cone body; however, it functions as a heat barrier which in effect dissipates part of the energy of the shock wave which is immediately adjacent to the surface 68 of the nose cone and so results in lower temperatures there. All of these transformations take place endothermically and result in overall heat transfer to cool the nose cone. Ionization of most gases will occur near temperature of 16,000° Kelvin, which are easily generated at the nose cone of a fast moving vehicle, due to aerodynamic heating during re-entry. At these elevated temperatures oxidation is not a significant factor and thus over a short period of time a large amount of heat may be dissipated.

Examples of the relative magnitude of a few of the endothermic reactions previously described are tabulated in Table V.

TABLE V

| Column | 1 | 2 | 3 | 4 |
|---|---|---|---|---|
| Reaction | Heat absorbed in calories per cubic centimeter of compound in reaction only | Heat of Column 1 plus heat from melting and vaporizing the metals | Heat of Column 2 plus heat of dissociation and ionization of the gas | Heat of Column 3 plus heat of dissociation and ionization of the metallic vapor |
| $2LiH \rightarrow 2Li + H_2$ | 2,230 | 6,330 | 42,930 | 55,730 |
| $TiH_2 \rightarrow Ti + H_2$ | 2,820 | 11,950 | 63,250 | 75,550 |
| $H_2 + Ni \rightarrow NiH_2$ | 684 | 11,054 | 92,554 | 113,024 |
| $TiH_2 + Ni \rightarrow Ti + NiH_2$ | 2,110 | 12,660 | 48,660 | 66,000 |
| $LiH + Cu \rightarrow CuH + Li$ | 1,585 | 8,950 | 30,500 | 48,550 |

The choice of the most desirable heat dissociable material for any particular application of this invention depends partly upon the characteristics of the material in which they are carried. For example, when it is desired to utilize heats of fusion and of vaporization of the metals involved, care should be taken to choose heat dissociable material whose native metal boiling point is below the melting temperature of the carrier. Thus, if a carrier refractory such as thorium dioxide ($ThO_2$) which has a melting point of approximately 3600° C. is chosen, then titanium hydride would be very suitable for use as heat dissociable material since titanium has a boiling point of 3535° C. Referring to Table V, it may be seen that titanium hydride is among the best materials to choose when it is desirable to utilize the heats of dissociation and of ionization of the evolved gas. However, when it is desirable to utilize heats of fusion and of vaporization of the metals but not the heats of dissociation and of ionization of the liberated gases, then the reaction of titanium hydride and nickel (boiling point is 2730° C.) would be among the best materials to use.

As also indicated before, alloys or mixtures of the hydride-forming metals are quite feasible. For example, alloys or mixtures of sodium and potassium (or other hydrides) with each other or with calcium, of calcium with barium or strontium, of zirconium with titanium or tantalum, of tantalum with strontium or potassium or both, of titanium and tantalum, of zirconium, titanium and tantalum, may be used in this invention, or of the hydrides of said metals. The alloys or mixtures may be of equal quantities of each metal or its hydride, or the proportions may be varied in any manner desired to achieve desired results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a space vehicle, a nose having an imperforate outer surface, a first series of generally longitudinally extending imperforate laminations substantially parallel to said outer surface, a second series of generally longitudinally extending cellular laminations also substantially parallel to said outer surface and alternating with said imperforate laminations, a plurality of generally longitudinally extending duct means, each between a pair of said imperforate laminations and in communication with a face of said cellular laminations, for carrying gas rearwardly from said nose, each said cellular lamination comprising a layer of cellular metal having wall portions defining cells, some said cells containing metallic hydride and other cells being empty to provide ducts, whereby heat developed at said nose during flight in the atmosphere causes outgassing of said metallic hydride, which flows through said duct means rearwardly from said nose and thereby tends to reduce the temperature of the surface of said nose.

2. The device of claim 1 wherein both said cellular metal and said imperforate laminations are made from the same kind of metal.

3. The device of claim 1 wherein said metallic hydride is chosen from the group consisting of the hydrides of lithium, sodium, potassium, rubidium, cesium, francium, calcium, strontium, barium, radium, beryllium, magnesium, scandium, titanium, vanadium, ytterbium, zirconium, niobium, palladium, hafnium, tantalum, the rare earth metals (atomic numbers 57–71), and the actinides (atomic numbers 89–103) and alloys of the metals of said group.

4. The device of claim 3 wherein the metallic hydride is mixed with metal chosen from the group consisting of copper, silver, molybdenum, tungsten, iron, cobalt, nickel, aluminum, platinum, manganese, technetium, rhenium, osmium, iridium, ruthnium, rhodium, and chromium.

5. In a space vehicle having an imperforate outer surface and incorporating adjacent said surface a honeycomb-like structure of carrier metal providing a plurality of cells, metallic hydride filling at least some of said cells and solid at 20° C. and dissociating into a metal and hydrogen when heated by atmospheric friction against said nose, and means to convey the gas away from the nose upon such dissociation, said carrier metal having a melting point higher than the temperature required for completion of the dissociation endotherm of said hydride, so as to support said hydride until said completion.

6. In space vehicle, a nose having laminations in layers from the outside in and comprising layers of first metal alternating with layers made up of a honeycomb-like structure of cell metal forming cells filled with hydride of metal from the group consisting of lithium, sodium, potassium, rubidium, cesium, francium, calcium, strontium, barium, radium, beryllium, magnesium, scandium, titanium, vanadium, ytterbium, zirconium, niobium, palladium, hafnium, tantalum, the rare earth metals (atomic numbers 57–71) and the actinides (atomic numbers 89–103), and means to convey away from said nose the hydrogen gas liberated by said hydrides when they are heated above their dissociation temperatures, said cell metal and said first-metal having melting points above the temperature required for completion of the dissociation endotherm of said hydride.

References Cited by the Examiner

UNITED STATES PATENTS

| 608,125 | 7/1898 | Hurst | 102—56 |
| 2,468,820 | 5/1949 | Goddard | 102—92.5 |
| 2,941,759 | 6/1960 | Rice et al. | 102—92.5 X |
| 2,943,828 | 7/1960 | Van Driest | 62—239 |
| 2,973,170 | 2/1961 | Rodman | 62—239 |
| 3,001,473 | 9/1961 | Shepheard | 102—92.5 X |
| 3,026,806 | 3/1962 | Runton et al. | 102—92.5 |

BENJAMIN A. BORCHELT, *Primary Examiner.*

SAMUEL FEINBERG, G. L. PETERSON, *Examiners.*